March 14, 1961
S. A. THORNTON
2,974,464
CANE COMBINE
Filed Dec. 16, 1957
4 Sheets-Sheet 1
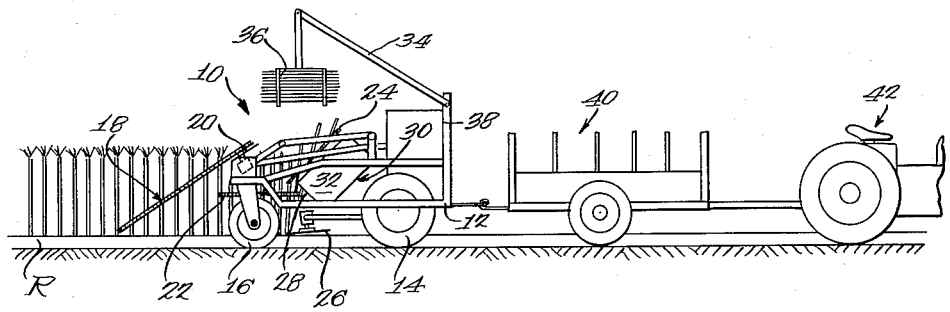
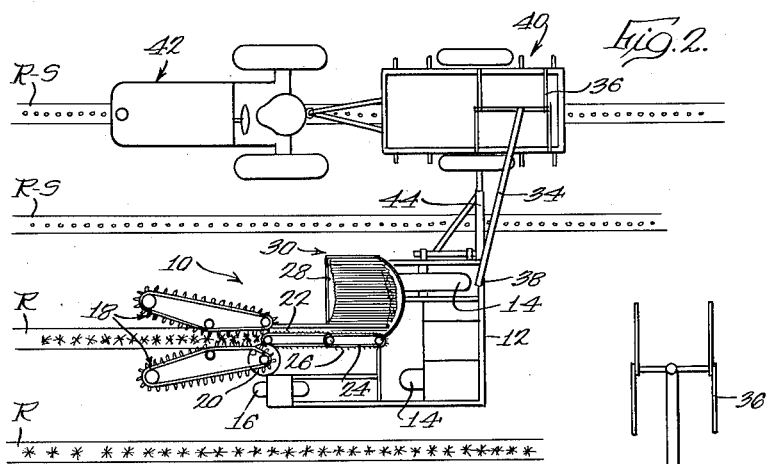
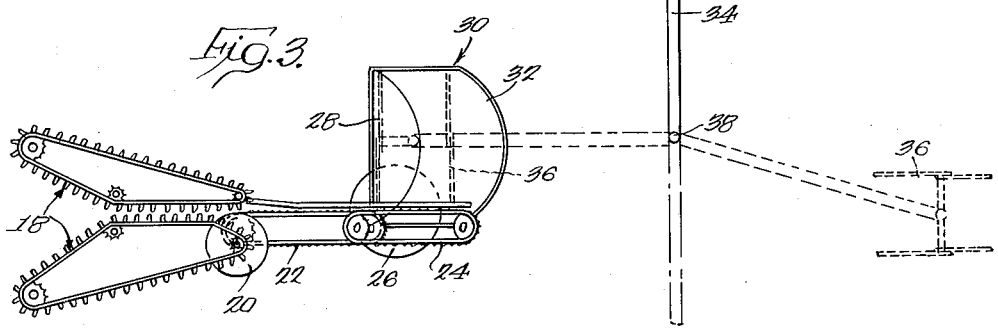
INVENTOR.
Samuel A. Thornton
BY
Brown, Jackson, Boettcher & Dienner
Attys.

March 14, 1961 S. A. THORNTON 2,974,464
CANE COMBINE
Filed Dec. 16, 1957 4 Sheets-Sheet 2
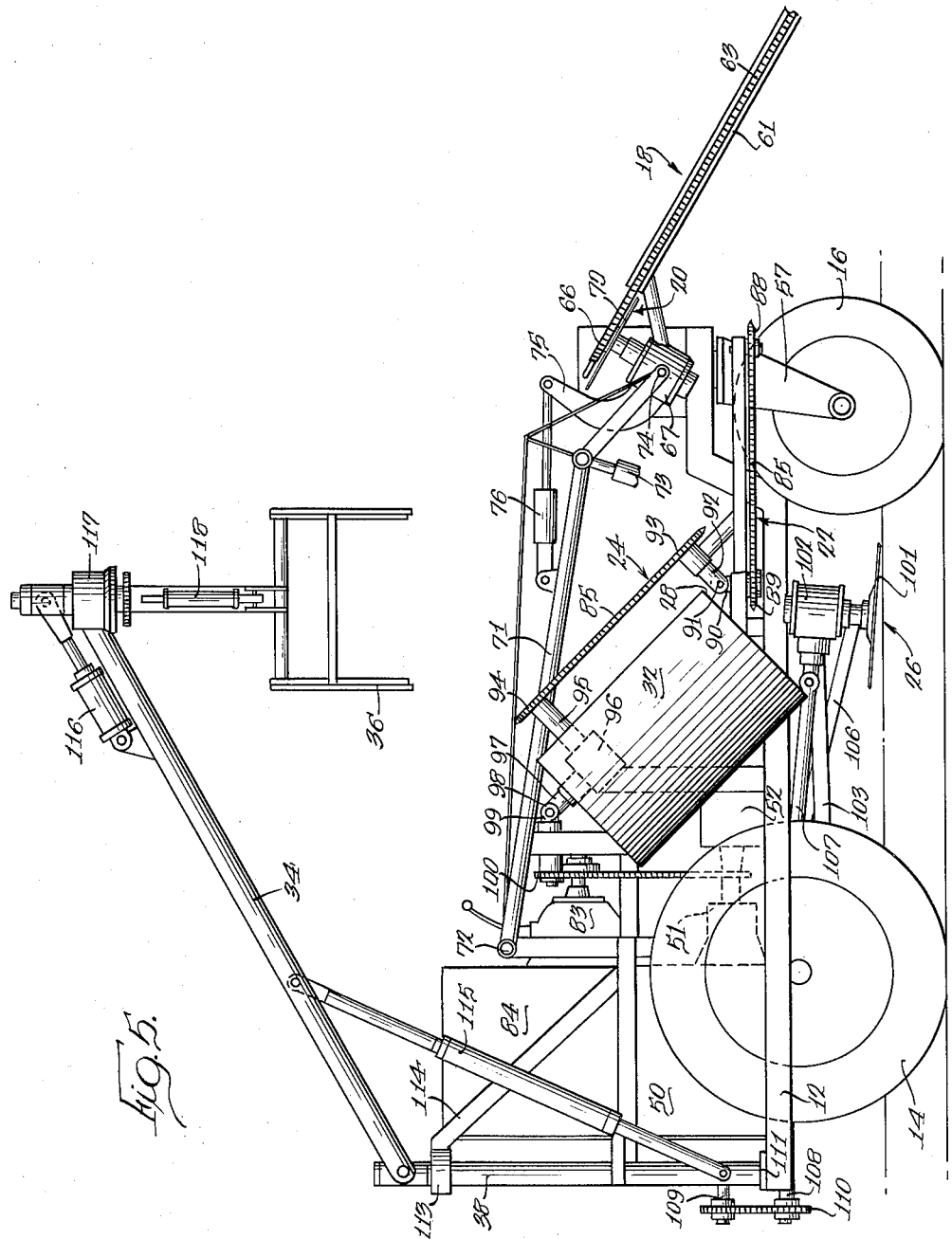
INVENTOR.
Samuel A. Thornton
BY
Brown, Jackson, Boettcher & Dienner
Attys.

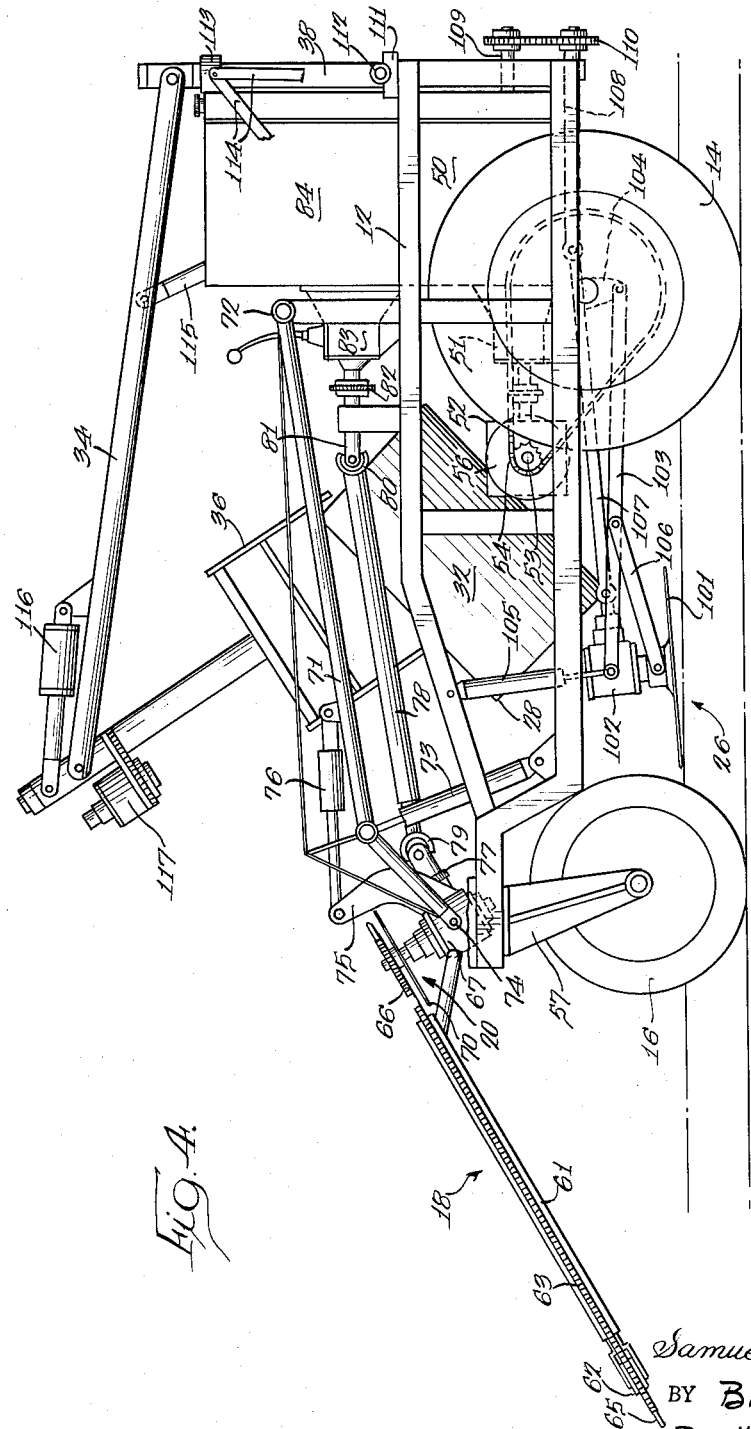

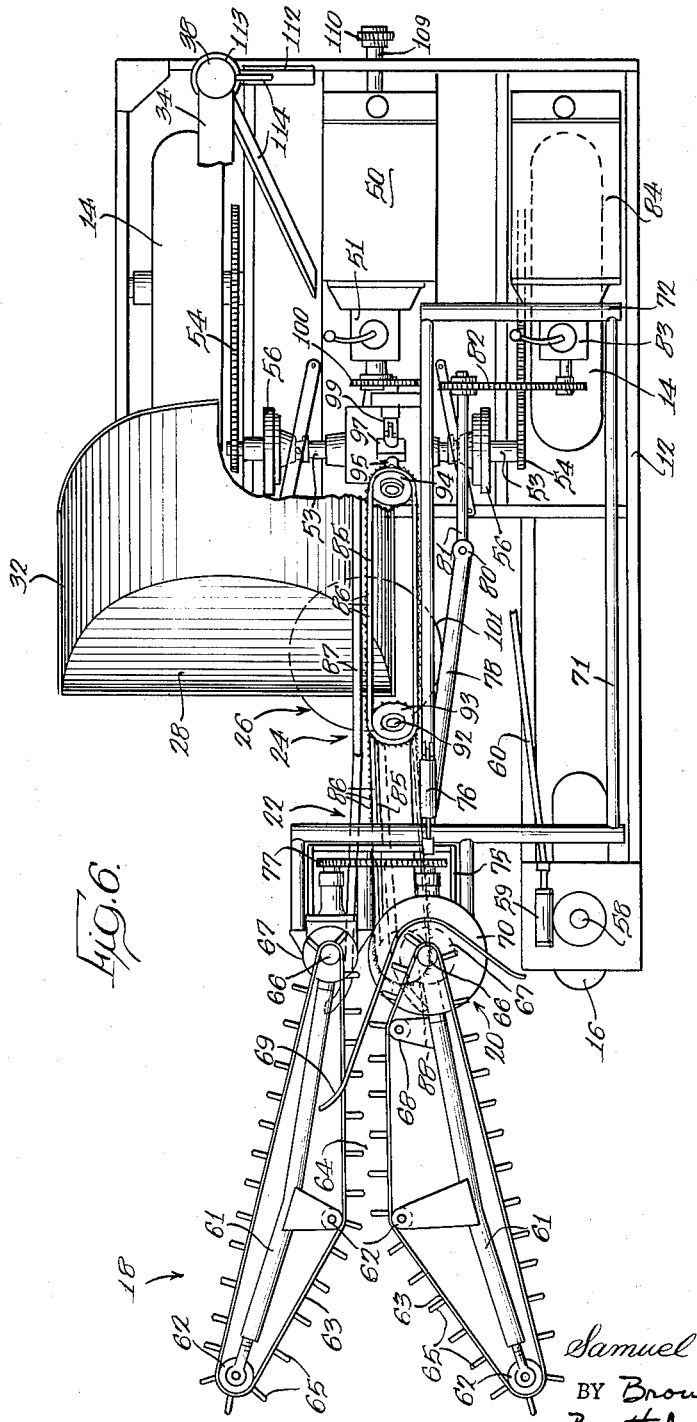

United States Patent Office 2,974,464
Patented Mar. 14, 1961

2,974,464

CANE COMBINE

Samuel A. Thornton, Jeanerette, La., assignor to Samuel A. Thornton, Jr., Alexandria, La.

Filed Dec. 16, 1957, Ser. No. 702,996

7 Claims. (Cl. 56—17)

The present invention relates to apparatus for harvesting sugar cane and like crops, and particularly, to an improved combine for automatically gathering, topping, severing and collecting cane stalks and for loading the collected stalks into a cart or like vehicle for delivering to the refinery.

Cane harvesters have previously been proposed for gathering and severing standing cane stalks and depositing the stalks horizontally across the tops of adjacent, previously cleared rows for subsequent collection manually or by means of a cane piler and loader. Such harvesters include as the gathering means a pair of forwardly and downwardly divergent conveyors adapted to be disposed to opposite sides of a row of cane and operative to stand the cane up and hold the same erect at the time of or immediately prior to severing of the stalks adjacent ground level. The gathering conveyors discharge the standing stalks into a second or transport conveyor which usually extends to one side of the harvesting vehicle and deposits the severed stalks on the ground for subsequent collection.

Heretofore, I proposed a cane harvesting combine wherein the transport conveyor extended longitudinally to the rear of the harvesting vehicle, at which point the conveyor deposited the stalks in a horizontally disposed tray rather than onto the ground. This tray was located directly beneath the fixed boom of a loading derrick which extended transversely of the vehicle and carried a grab for loading the cane stalks from the tray into a cane cart being pulled parallel to and at the same speed as the combine. My harvesting combine afforded substantial advantages over earlier harvesters in eliminating the necessity for collection and loading of cane as a step separate from that of harvesting.

However, even my combine suffered several disadvantages in terms of inefficient cane transport and irregular disposition of the cane in a jumbled condition in the collecting tray, with consequent delivery of the cane to the refinery in an unsatisfactory state. Also, my harvester, like those previously known to the art, suffered the disadvantages that several starter rows in each field had to be cleared by hand before the harvester and cart could enter the field, due to the necessity for depositing or loading the cane stalks to one side of the harvesting vehicle.

The object of the present invention is to provide an improved cane combine of economical and practical construction that overcomes the disadvantages of previously known harvesters, that facilitates complete harvesting of the sugar cane and that insures delivery of the cane to the refinery in optimum condition for immediate processing.

Among the more specific objects of the invention is the provision, in combination on a harvesting vehicle, of cane gathering, topping and severing means, a cane collecting space located adjacent said means for efficient delivery thereto of the topped and severed stalks, and a movable cane transferring device so located relative to the collecting space as to remove with facility a balanced load of stalks from said space and deposit the load of stalks at either side or to the rear of the vehicle as desired. Loading of the stalks to the rear of the vehicle particularly facilitates use of my improved combine without necessity for clearing starter rows in a field.

Another object of the invention is the provision in a cane harvester of a cane collecting space located in the closest practical proximity to the severing means or bottom stalk cutter, thereby to hold at a minimum the transport distance of the severed stalks and mitigate to the greatest possible extent loss or waste of cane stalks during harvesting.

A further object of the invention is to provide, as said collecting space, upwardly open box means disposed at an inclination to the horizontal, the box means having a lower end wall against which, due to gravity, the ends of deposited cane stalks will abut, automatically to effect regular, uniform disposition of the stalks in the box means in parallel coextensive relation.

A still further object of the invention is the provision of an improved cane combine comprising cane gathering, transporting, topping and severing means, collecting box means disposed parallel to said transporting means adjacent said severing means with one longitudinal edge portion thereof aligned generally with said transporting means, the box means including an upwardly open semi-cylindrical bottom wall inclined to the horizontal and a lower end wall against which the ends of the cane stalks deposited therein abut, the cane stalks, due to the curvature of said bottom wall, also rolling into the center of the box means and being collected therein in parallel coextensive relation, and a movable cane grab mounted for movement into and out of the central portion of said box means to remove therefrom balanced loads of cane stalks and for swinging movement in such arc as to deposit loads of cane stalks to either side or the rear of the combine.

These and other objects of the invention will become more fully apparent from the following detailed description of a preferred embodiment of the invention.

Now, in order to acquaint those skilled in the art with the manner of making and using the cane combine of my invention, I shall describe, in connection with the accompanying drawings, a preferred embodiment of the combine and a preferred manner of making the same.

In the drawings:

Figure 1 is a diagrammatic side view of my improved cane combine, a cane cart and a tractor for the cart showing generally one manner in which my combine is employed in a cane field;

Figure 2 is a diagrammatic plan view of the combine, cart and tractor showing a second manner of use in the field;

Figure 3 is a schematic representation in plan of the cane gathering, topping, transporting and severing means, the collecting space and loading means of my improved combine showing the preferred relationship of said means and space to one another;

Figure 4 is a view in elevation of the left side of the preferred embodiment of my improved combine;

Figure 5 is a view in elevation of the right side of said embodiment; and

Figure 6 is a plan view of said embodiment, with certain parts broken away to reveal underlying apparatus.

In Figures 4, 5 and 6 of the drawings, certain portions of the combine that would normally be observed in the background have been omitted for the sake of clarity.

Referring now to Figures 1 to 3, I have illustrated therein the manners of use of my combine, from which the purpose and function of the specific apparatus shown in Figures 4 to 6 will become apparent. In Figures 1 and 2, my improved combine, indicated generally at 10, is illustrated as comprising a wheeled vehicle having a frame 12 of general L-shape as viewed in plan, a pair of laterally spaced traction wheels 14 mounted adjacent the outboard edges of the base of the L and a steering wheel 16 mounted at the free end of the leg of the L. The steering wheel is aligned longitudinally of said leg with one of the traction wheels 14, and the traction wheels are spaced apart a distance equal approximately to the spacing between adjacent rows R of cane in the field, whereby the vehicle is adapted to straddle a single row R as shown in Figure 2 without interfering with adjacent rows.

At its forward end, the vehicle mounts, preferably in an adjustable manner, a cane gathering means 18 which projects downwardly and forwardly relative to the vehicle. The gathering means may be of any known type and I have illustrated the same as comprising coplanar endless chains or conveyors mounted in forwardly and downwardly divergent relation to define therebetween a cane gathering space of progressively decreasing width narrowing at the upper inner ends of the two chains or conveyors to a bight portion aligned substantially with the longitudinal axis of the vehicle. The gathering means is preferably adjustable to accommodate vertical adjustment of the same corresponding to the height of the cane to be harvested and to dispose the means at an inclination to extend from adjacent the bottom of the cane stalks to adjacent the top of the stalks. Drive means are also provided for the chains or the conveyors of the gathering means whereby, as the vehicle is advanced along the row, the gathering means stands the uncut cane stalks up in a straight vertical row.

The gathering means 18 also serves to mount at its upper inner end, and to drive, a cane topping means 20 in the form of a rotary cutting blade mounted on one of the gathering conveyor drive sprockets or a pair of overlapping cutting blades mounted respectively on corresponding ones of the drive sprockets of the two gathering conveyors. Being disposed at the upper inner end of the gathering means, the topping means 20 acts upon a straight row of cane adjacent the upper ends of the stalks to cut off and discharge onto the ground the unwanted portion of the tops of the cane stalks.

Shortly before the stalks are topped by the means 20, the gathering means 18 guides the upright, straight row of cane stalks into the forward receiving end of a first transporting means comprising a conducting conveyor 22 which extends horizontally beneath the bight portion of the gathering means and rearwardly of the topping means to a second transporting means in the form of an elevating conveyor 24 which extends upwardly and rearwardly from just above the discharge end of the conveyor 22. The conducting and elevating conveyors 22 and 24 are driven in a manner to be described hereinafter to perform the following functions.

The conducting conveyor 22 conducts the upright straight row of topped, but still unsevered cane stalks rearwardly along the longitudinal axis of the combine into the firm seizure of the forward end of the elevating conveyor 24. Immediately below the forward end of the elevating conveyor, the vehicle carries a severing means or bottom cutter 26 in the form suitably of a positively driven rotary blade which is preferably vertically adjustable to accommodate disposition of the same immediately above the upper surface of the ground in the row to cut the cane stalks at their bottoms. The stalks are thereby severed at their bottoms just as they are firmly seized by the elevating conveyor 24.

The elevator 24, which grips the stalks at a predetermined height above ground, lifts the severed cane, single file, off the severing means and carries the same upwardly and rearwardly. As it does so, the lower ends of the stalks are dragged over an obstruction 28 which causes the stalks to move into approximate parallelism with the elevator 24, the elevator then carrying the stalks in such position to the discharge end thereof. Since the elevator always grips the stalks at a predetermined height, and since the location of the obstruction is fixed, the elevator need be only of such height as to cause the lower ends or bottoms of the stalks to clear the obstruction.

Immediately rearwardly of the obstruction 28, a cane receiving or collecting space or area 30 is defined on the vehicle, which area extends from the elevating conveyor 24 laterally to the side of the vehicle. Definition of such space is particularly facilitated by the L-shape of the vehicle frame. According to a further feature of the invention this space is occupied by a receptacle or box means 32 including bottom wall means inclined laterally of the vehicle and a transverse end wall, the inclined wall means being aligned adjacent one edge thereof with the elevator 24 and extending parallel thereto. The box means is also disposed at the same inclination along its longitudinal axis as the elevator 24, and the end wall thereof is disposed at the lower end of the box means and comprises said obstruction 28.

By virtue of the relationship of the box means 32 to the elevator 24, the elevator, when it discharges the stalks, releases the same substantially parallel to the longitudinal axis of the box means whereby each stalk gravitates parallel to the longitudinal axis of the vehicle onto the inclined wall means of the box means adjacent one edge thereof. Due to the inclination of said wall means, each stalk rolls about its own axis away from the elevator and, due to the inclination of the box along its longitudinal axis, gravitates into abutment at its lower end against the end wall 28. Thus, the severed stalks are deposited and collected in a neat pile in parallel coextensive relation in the receptacle or box means 32 at a location spaced laterally from the gathering, topping, transporting, severing and elevating means. The receptacle has no upper end wall, thus facilitating reception therein of stalks of any length, and is open at its upper side to facilitate removal therefrom of the stalks.

While not shown herein, suitable detrashing means for the cane stalks may also be provided further to insure deposit of only clean stalks in the box.

In view of the foregoing, it is to be appreciated that the harvester as thus far described, upon advance along a row of cane, automatically gathers the leaning and standing stalks in the row into an upright position in a straight row, tops the cane at a height assuring that, without waste, only the useful portions of the cane stalks are harvested, severs the stalks at their bottoms and deposits the cut stalks in a neat pile at a readily accessible location on the harvester. Due to the fact that the cane is retained in standing position, is not severed until topped and firmly gripped, and is then immediately deposited in an immediately adjacent collecting space, the combine harvests the cane in a highly efficient manner with substantially no waste of cane.

When a certain amount of cane has been collected or deposited in a neat pile in the said readily accessible location on the harvester, i.e., the box 32, the pile may conveniently be transferred to a cane transport vehicle. For this purpose, the cane combine of the present invention includes a movable transferring boom 34 carrying an adjustable cane grab 36. The boom 34 is mounted for horizontal swinging movement about a vertical axis defined by a rotatable supporting mast 38, which is preferably disposed in alignment with the longitudinal axis of the box means or receptacle 32 to best accommodate positioning of the grab 36 in the box. The boom 34 is pivotally mounted on the upper end of the mast to move the grab into and out of the receptacle or box and the grab in turn is adjustably mounted on the outer end of the boom to move into and out of the box means with its arms substantially perpendicular to the bottom wall means of the box and parallel to the longitudinal axis thereof, suitable means being provided for remotely controlling the movements of the boom and of the grab relative thereto.

The cane transferring means disclosed herein is particularly distinguished by mounting thereof to swing in an arc of at least 190 degrees and preferably 270 degrees, so that the grab can be moved at least to the side of the vehicle on which the box is mounted and to the rear of the vehicle, and preferably also to the opposite side of the vehicle. As a consequence of this arrangement, the present invention obviates the need, as was previously the case, of manually clearing several starter rows in each field. For example, the harvester of the invention is shown in Figure 1 as the same would be used in clearing the first row of cane in a field. In this instant, the cane cart or cane transport vehicle 40 and its towing tractor 42 are backed up behind the harvester 10 as the harvester advances along the starter rows, the harvester clearing the way for itself and the vehicles 40 and 42. During such operation, the vehicles 40 and 42 are preferably assisted in their backward travel behind the harvester 10 by a towline, adjustable in length, extending rearwardly from the harvester. As the harvester advances, the cane is collected in the box means 32 in a neat and orderly manner as previously described. When a pile of stalks has accumulated, the boom 34 and grab 36 are actuated to move the grab into the central portion of the box, which as above described is located to one side of the gathering, cutting and transporting apparatus thereby to facilitate ready and convenient access of the grab to the collected cane. The grab enters the box means, preferably adjacent the upper end thereof, to pick up a neat and orderly load of cane in a balanced condition relative to the grab. The boom is then elevated and swung horizontally, preferably in an arc of 190 degrees, to position the grab 36 centrally behind the harvester and directly over the cart 40 whereupon the boom may be lowered and the grab opened to place the load of cane, still in a neat and orderly pile, accurately into the cart. Loading or transferring of cane is repeated in the manner described until one cart has been filled, whereupon the one cart may be hauled away and an empty cart moved into its place. During changing of the carts, the cane simply accumulates in the box means 32 for subsequent loading into the empty cart.

After two starter rows, as indicated at R—S in Figure 2 have been cleared, the cart 40 and its tractor 42 are preferably moved parallel to and forwardly in thhe same direction as the harvester, as shown in Figure 2, the tractor and its cart straddling the first row (now cleared) and the harvester straddling the third row. While the cart may be disposed at either side of the harvester, assuming that appropriate rows have been cleared, I prefer to so use the harvester that the cart will be disposed to the side thereof on which the collecting box 32 is mounted to keep to a minimum the distance through which the load must be moved, thus to speed loading and mitigate cane loss. In such use, the cart is preferably so positioned that its transverse axis substantially intersects the vertical axis of the boom, thereby to keep boom length at a minimum and to dispose the cart at such position in the arc of horizontal movement of the boom as has the least component of movement transversely of the cart. To locate the cart accurately in such position, thus to attain the stated advantages and further to insure conjoint movement of the harvester and cart, I provide a positioning arm 44 on the harvester which has an outer end adapted for quick attachment to and detachment from the cart axle, the arm fixing the cart to the harvester with the axis of its wheels intersecting the vertical axis of the boom. The arm 44 is mounted on the harvester for vertical swinging movement to swing the same out of the way when not in use and when the harvester is clearing the starter rows R—S. By virtue of this arrangement, the loading boom is required to swing in a horizontal arc of only about 70 degrees to 105 degrees to place cane accurately in any desired part of the cart.

Thus, the loading device of my harvester is normally required to swing in an arc of no more than about 190 degrees. However, as a precautionary measure, and to render the harvester universal in its application, I prefer to mount the loading or transferring boom for movement of 270 degrees in the horizontal plane. Relative to use of the boom, it is also to be noted that should there be a long delay between substitution of an empty cart for a full cart, neat uniform piles of cane may be transferred to the ground and accurately positioned across the tops of adjacent, previously cleared rows, either to the side or behind the combine.

In view of the foregoing, it is to be appreciated that the cane combine of the present invention affords in one compact unit a complete cane harvester that efficiently harvests all of the cane in a field without need for manual clearing of starter rows or the like. Also, my improved combine could quite easily be operated by only one man, thus to reduce manpower requirements to a minimum. However, I prefer, for the sake of greatest convenience, to have two operators, one to steer the combine and oversee its operation and another to operate the cane transferring grab and boom.

As to a specific embodiment of the invention, I have shown in Figures 4, 5 and 6 the structure I prefer for carrying the invention into commercial practice. As shown in these figures, the L-shaped frame 12 of the combine may suitably be formed in skeletal fashion from structural steel forms to define upper and lower frame portions at the rear of the vehicle and an intermediate platform at the forward end of the leg of the L. The traction wheels 14 are suspended or mounted individually on the lower frame portion and are adapted to be driven by a main or propulsion engine 50 supported on the lower frame portion intermediate the wheels 14. The engine 50 is coupled to the wheels by means of a change speed transmission 51, a gear box 52, drive shaft means 53, and chain and sprocket connections 54 between the drive shaft means and each wheel. To assist in steering the combine, the drive coupling from the gear box 52 to each wheel includes an individually controllable friction clutch 56 suitably installed in the respective portion of the drive shaft means 53.

The steering wheel 16 is mounted on a conventional steering fork 57 which includes a shank 58 journaled in a bearing carried by the platform at the outer end of the leg of the L-shaped frame. The shank is coupled by a typical gear and worm connection 59 to a steering post 60 which may extend to any suitable driver location on the vehicle.

The cane gathering means 18 comprises a pair of forwardly and downwardly divergent frames 61 each rotatably mounting a plurality of guide sheaves 62 for supporting and guiding an endless chain 63 about each frame 61. The frames are so constructed and the sheaves so placed that the chains 63 are widely divergent at their lower forward ends and narrow to a relatively long bight portion 64 in which the cane stalks are maintained in an upright position in a straight row. Each chain carries a plurality of spaced gathering fingers 65 projecting horizontally therefrom, and the two chains are so correlated that the fingers on the chains interleave or mesh with one another in the said bight portion 64. Adjacent their upper rearward ends, each frame 61 carries a drive sprocket 66 and a gear box 67 for imparting rotary movement to the sprocket from a source to be described, whereby the chains 18 are both moved, at their inner adjacent runs, upwardly and rearwardly for the purpose described.

The sprocket 66 of the left hand gathering chain is offset to the left side of the bight 64, and the respective frame 61 carries an extra guide sheave 68 for maintaining the respective chain parallel to the other chain in the bight area. The left hand frame 61 also carries a deflector 69 extending across the bight and laterally to the left of the gathering means for deflecting the cane tops along the path defined thereby. A circular cane topping blade 70 is mounted on the shaft of the drive sprocket 66 for the left hand chain in intersecting relation to the path defined by the deflector 69, whereby the blade is rotated conjointly with the sprocket to top the cane stalks adjacent the upper rearward end of the bight portion 64 of the gathering means, the deflector 69 thereafter discharging the severed cane tops off to the left of the harvester.

The gathering means 18 and topping blade 70 and deflector 69 are mounted, for conjoint adjustment relative to the frame, on a vertically movable boom-like structure 71, suitably formed of pipe, which is pivotally mounted at 72 on the upper portion of the frame 12. To effect vertical adjustment of the support structure 71, thus to move the gathering means bodily in the vertical direction, a pneumatic or hydraulic motor 73 is extended between the lower portion of the frame 12 and the boom-like structure in forwardly spaced relation to the pivot axis 72. To correlate the inclination of the gathering means to the vertical position of the upper end thereof, thereby to insure proper gathering of the cane, the sprocket drive gear boxes 67 and the frames 61 of the gathering means are rigidly interconnected and mounted as a common unit on a horizontal pivot axis 74 at the outer, forward end of the structure 71. To effect movement of the gathering means about the pivot 74, a crank arm 75 is extended upwardly and rearwardly from one gear box 67 and connected to a hydraulic or pneumatic motor 76 which is anchored on the structure 71. Suitable piping and control means (not shown) are extended in any conventional manner from both of the motors 73 and 76 to the driver location on the combine to facilitate remote control over the disposition of the gathering and topping means.

The two gear boxes 67 of the gathering means 18 are operatively interconnected by a chain and sprocket drive 77, one sprocket of which is rotated by means of a connecting shaft 78. The shaft 78 is connected to the sprocket at one end by a universal 79, and is connected at its opposite end by a universal 80 to a stub shaft 81 journaled on the upper portion of the frame. The stub shaft 81 in turn is driven through a chain and sprocket connection 82 and a change speed transmission 83 from an auxiliary engine 84 mounted on the upper portion of the frame 12 above the left traction wheel of the combine. This engine may also be employed to drive a compressor or pump (not shown) for supplying in a conventional manner actuating fluid to the motors 73 and 76, and the other pneumatic or hydraulic motors to be described hereinafter.

The transporting conveyor means 22 and 24 are both preferably of the sticker chain type and each include an endless chain 85 provided at spaced intervals with sticker teeth 86, and a pressure bar 87 coextensive with one run of the chain. The conducting conveyor 22 is not employed as a conventional sticker chain, but has the bar thereof spaced from the chain, as seen in Figure 6, simply to guide the standing stalks into a narrower bight than the portion 64, thereby to move the stalks accurately into the narrow receiving end of the elevator 24. The sticker chain 85 of the elevator 24 is disposed closely adjacent its pressure bar 87 firmly to seize each cane stalk as the same is guided therein by the conveyor 22.

The conveyor 22 is disposed horizontally at approximately the level of the lower frame and extends forwardly beneath the gathering means 18. The chain of the conveyor 22 is supported at its forward end by a sprocket 88 carried by the frame. A similar sprocket 89 is provided at the rearward end of the chain, which sprocket is carried by an elongate vertical shaft 90 journaled in a bearing carried by the frame. The shaft 90 is connected at its upper end by means of a universal 91 to the shaft 92 of the forward chain-supporting sprocket 93 of the elevator 24. The elevator 24 is disposed at an inclination, preferably of about 45 degrees, to the horizontal, and the chain thereof is supported at its upper end by a sprocket 94 which is carried by a shaft 95 journaled in a gear box 96 mounted on the frame. The gear box 96 includes an input shaft 97 which is connected by a universal 98 to a stub shaft 99 journaled on the frame, which latter shaft is driven through a chain and sprocket connection 100 from the main engine 50. The drive connections between the engine 50 and the traction wheels 14, and between the engine 50 and the sticker chains 85 is such that the chains move at the same speed relative to the ground as the vehicle, thus to insure optimum handling of the cane.

The bottom cutter or severing means 26 of the combine preferably comprises a circular cutting blade 101 carried by the output shaft of a gear box 102 that is adjustably mounted on the frame 12 by means of a vertically movable arm 103 which is pivoted to the lower portion of the frame by means of a clevis 104 or the like. The arm accurately positions the blade 101 in the aforesaid relation to the elevator 24 to sever the cane stalks at substantially the instant they are seized by the elevator. Vertical adjustment of the blade 101 relative to the ground is accomplished by means of a pneumatic or hydraulic motor 105 which depends from the frame 12 and is pivotally connected to the arm 103 and gear box 102. Control means (not shown) for the motor 105 are suitably provided at the driver's station on the combine. To accommodate adjustment of the inclination of the severing blade 101 to the ground, thereby to insure an optimum cut as close as possible to the ground without actually digging into the ground, I provide an adjustable link 106 between the arm 102 and a collar on the blade shaft. The severing blade 101 is driven from the gear box 102 by means of a shaft 107 which is universally connected at its opposite ends to the input shaft of the gear box 102 and a stub shaft 108 which is rotatably mounted on the frame and driven from the power takeoff 109 of the engine 50 by a chain and sprocket connection 110.

By virtue of the L-shape of the frame 12 of the vehicle, the cane collecting space 30 is conveniently provided below and to the right of the elevator 24, which space is occupied by the receptacle or box 32. The box 32, as shown in Figures 4 to 6, preferably comprises a semi-cylinder formed of sheet metal including an upwardly open semi-cylindrical bottom wall and a complementary lower end wall 28. The box is disposed with its inboard edge just below and in vertical alignment with the elevator 24 and at the same inclination upwardly and rearwardly as the elevator, i.e., at an angle of about 45 degrees, and with the end wall 28 thereof immediately rearwardly of the severing blade 101. The box is of large size and the longitudinal axis thereof is widely spaced from the transporting means 22 and 24 to facilitate entry therein of the loading grab 36. The box is suitably about 3 to 3½ feet long and open at its upper end to receive and retain therein severed cane stalks of substantially any length, cane stalks usually being between 3 and 8 feet long.

The boom supporting mast 38 of the cane loading means may suitably comprise a tube or pipe journaled in a bearing 111 provided on the lower portion of the frame, the mast being operatively connected to a hydraulic or pneumatic motor 112 for pivoting the mast about its axis. Adjacent its upper end, the mast is braced by an encircling collar 113 which is supported above the frame by diagonal struts 114. At its upper end, the mast pivotally mounts the boom 34, and a hydraulic or pneumatic motor 115 is provided between the lower end of the mast and an intermediate point on the boom for raising and lowering the boom. At its outer end, the boom supports the cane grab 36 for substantially universal movement, the grab being pivotally movable by a first hydraulic or pneumatic motor 116 and rotatable by a second hydraulic or pneumatic motor 117, thereby to permit accurate correlation of the grab to the box and cane transport vehicles. The arms of the grab 36 are adapted to be actuated by a third hydraulic or pneumatic motor 118 to grab and release its loads at the will of the operator. Suitable conduit and control means (not shown) are provided for the motors 112, 115, 116, 117 and 118, and all of the controls are mounted at a loader operator's station located on the vehicle in such position as to afford the operator a clear view of the box 32 and both sides and the rear of the harvester.

By means of the specific structure shown in Figures 4 to 6, all of the hereinbefore described functions are readily and practically carried out, the specified structure adhering in all respects to the relationships and details illustrated schematically in Figure 3. The structure is economical, conveniently fabricated and assembled and of such sturdy character as to insure long service. All of the components are so arranged as to assure complete maneuverability and adjustability, and yet are embodied in an exceedingly compact assembly. Thus, it is apparent that all of the objects and advantages of the invention are attained in a practical, convenient and economical manner.

While I have shown and described what I regard to be the preferred embodiment of my invention, it is to be appreciated that various changes, rearrangements and modifications may be made therein without departing from the scope of the invention, as defined by the appended claims.

I claim:

1. A cane combine comprising, in combination, a frame having a rearwardly disposed transverse base portion for straddling a cane row, cane stalk conveying means mounted on said frame and extending longitudinally rearward of said frame substantially centrally thereof from forwardly of the frame to approximately the forward edge of said base, a stalk receiving receptacle mounted on said frame forwardly of and adjacent one end of the base, said receptacle being mounted with one edge portion thereof below and parallel to the rearward end portion of said conveying means and the remainder thereof extending laterally away from said conveying means, and severing means mounted on said frame beneath said receptacle and including a cutting edge located substantially at the intersection of said conveying means and said receptacle.

2. A cane combine comprising, in combination, a frame having a rearwardly disposed transverse base portion and a supporting wheel at each end of said base portion for straddling a cane row, cane stalk conveying means mounted on said frame and extending longitudinally rearward of said frame substantially centrally thereof from forwardly of the frame to approximately the forward edge of said base, a stalk receiving receptacle mounted on said frame forwardly of and adjacent one end of the base, said receptacle being mounted with one edge portion thereof below and parallel to the rearward end portion of said conveying means and the remainder thereof extending laterally away from said conveying means, said receptacle being inclined forwardly downward and including a transverse front wall and a bottom wall disposed directly over the forward portion of the wheel at the respective end of said base, and severing means mounted on said frame beneath said receptacle and including a cutting edge located substantially at the intersection of said conveying means and said receptacle.

3. A cane combine comprising, in combination, a frame having a rearwardly disposed transverse base portion for straddling a cane row, cane stalk conveying means extending longitudinally rearward of said frame substantially centrally thereof from forwardly of the frame to approximately the forward edge of said base, supporting structure for said conveying means mounted on said frame solely at one side of said conveying means, a stalk receiving receptacle mounted on said frame forwardly of the base to the side of said conveying means opposite said supporting structure, said receptacle being mounted with one edge portion thereof below and parallel to the rearward end portion of said conveying means and the remainder thereof extending laterally away from said conveying means to the side thereof opposite said supporting structure, said receptacle including a transverse front wall and bottom wall means inclined laterally downward in the direction away from said conveying means, and severing means mounted on said frame beneath said receptacle and including a cutting edge located substantially at the intersection of said conveying means and said receptacle, whereby the conveying distance for severed stalks is maintained at a minimum and the severed stalks due to the inclination of said bottom wall means are collected laterally outward of the conveying means at an upwardly unobstructed location on the combine.

4. A cane combine comprising, in combination, an L-shaped frame having supporting wheels at the three corners thereof the axes of which extend transversely of the leg of the L, the outer end of the leg of the L comprising the front of the combine and the base of the L comprising a transverse base portion for straddling a cane row, cane stalk conveying means extending longitudinally rearward parallel to the leg of the L substantially centrally of said frame from forwardly of the frame to approximately the forward edge of the base of the L, supporting structure for said conveying means mounted on said frame at the side of said conveying means adjacent the leg of the L, a stalk receiving receptacle mounted on said frame forwardly of the base of the L adjacent the end thereof opposite the leg of the L, said receptacle being mounted with one edge portion thereof below and parallel to the rearward end portion of said conveying means, the remainder of said receptacle extending laterally away from said conveying means to the side thereof opposite the leg of the L, and severing means mounted on said frame beneath said receptacle and including a cutting edge located substantially at the intersection of said conveying means and said receptacle.

5. A cane combine comprising, in combination, an L-shaped frame having supporting wheels at the three corners thereof the axes of which extend transversely of the leg of the L, the outer end of the leg of the L comprising the front of the combine and the base of the L comprising a transverse base portion for straddling a cane row, cane stalk conveying means extending longitudinally rearward parallel to the leg of the L substantially centrally of said frame from forwardly of the frame to approximately the forward edge of the base of the L, supporting structure for said conveying means mounted on said frame at the side of said conveying means adjacent the leg of the L, a stalk receiving receptacle mounted on said frame forwardly of the base of the L adjacent the end thereof opposite the leg of the L, said receptacle being mounted with one edge portion thereof below and parallel to the rearward end portion of said conveying means, the remainder of said receptacle extending laterally away from said conveying means to the side thereof opposite the leg of the L, severing means mounted on said frame beneath said receptacle and including a cutting edge located substantially at the intersection of said conveying means and said receptacle, whereby the conveying distance for severed stalks is maintained at a minimum and the severed stalks are accumulated in said receptacle at a freely accessible and upwardly unobstructed location on the combine, a mast mounted on the base of the L rearwardly of said receptacle, a boom movably mounted on said mast for vertical movement and for horizontal swinging movement from a position over the receptacle in the direction outwardly of the side of the frame opposite the leg of the L, and a grab mounted on the outer end of said boom for entry into said receptacle and for movement outwardly of the side of the combine for unloading cane stalks accumulated in said receptacle.

6. A cane combine comprising, in combination, a frame having a rearwardly disposed transverse base portion for straddling a cane row, cane stalk conveying means extending longitudinally rearward of said frame substantially centrally thereof from forwardly of the frame to approximately the forward edge of said base, supporting structure for said conveying means mounted on said frame solely at one side of said conveying means, a stalk receiving receptacle mounted on said frame forwardly of said base to the side of said conveying means opposite said supporting structure, said receptacle being mounted with one edge portion thereof below and parallel to the rearward end portion of said conveying means, the remainder of said receptacle extending laterally away from said conveying means to the side thereof opposite said supporting structure, said receptacle including a transverse front end wall and bottom wall means inclined forwardly downward and laterally downward in the direction away from said conveying means, severing means mounted on said frame beneath said receptacle and including a cutting edge located substantially at the intersection of said conveying means and said receptacle, a mast mounted on said base rearwardly of said receptacle, a boom movably mounted on said mast for vertical movement and for horizontal swinging movement through an arc of at least about 190 degrees, said boom being of a length to extend over the receptacle and being mounted for swinging movement from a position over the receptacle outwardly of the side of the frame opposite said supporting structure to at least a position wherein its outer end is located centrally behind said base, a grab movably mounted on the outer end of said boom, and means for moving said boom and actuating said grab for moving said grab into and out of said receptacle, for picking up loads of stalks therefrom, for swinging said boom and grab outwardly beyond said frame both to the side of said frame opposite said supporting structure and to the rear of said base, and for manipulating said boom and grab to place loads of stalks into a cart longitudinally of and to the full capacity of the cart or onto the ground transversely of the stalk rows.

7. A cane combine comprising, in combination, an L-shaped frame having supporting wheels at the three corners thereof the axes of which extend transversely of the leg of the L, the outer end of the leg of the L comprising the front of the combine and the base of the L comprising a transverse base portion for straddling a cane row, cane stalk conveying means extending longitudinally rearward parallel to the leg of the L substantially centrally of said frame from forwardly of the frame to approximately the forward edge of the base of the L, supporting structure for said conveying means mounted on said frame at the side of said conveying means adjacent the leg of the L, a stalk receiving receptacle mounted on said frame forwardly of the base of the L adjacent the end thereof opposite the leg of the L, said receptacle being inclined forwardly downward and including a transverse front end wall and a bottom wall disposed over the forward portion of the wheel at the respective end of the base of the L, said receptacle being mounted with one edge portion thereof below and parallel to the rearward end portion of said conveying means and the remainder thereof extending laterally away from said conveying means to the side thereof opposite the leg of the L, said bottom wall being inclined laterally downward in the direction away from said conveying means, severing means mounted on said frame beneath said receptacle and including a cutting edge located substantially at the intersection of said conveying means and said receptacle, whereby the conveying distance for severed stalks is maintained at a minimum and the severed stalks, due to the inclination of said receptacle and its bottom wall, are collected in parallel coextensive relation laterally outward of the conveying means at an upwardly unobstructed location on the combine, a mast mounted on the base of the L rearwardly of said receptacle and immediately to the rear of the said respective wheel, a boom movably mounted on said mast for vertical movement and for horizontal swinging movement through an arc of at least about 190 degrees, said boom being of a length to extend over said receptacle and being mounted for swinging movement from a position over the receptacle in the direction outwardly of the side of the frame opposite the leg of the L to at least a position wherein its outer end is located centrally behind the base of the L, a grab movably mounted on the outer end of said boom, and means for moving said boom and actuating said grab for moving said grab into and out of said receptacle and for swinging said boom and grab outwardly beyond the side of said frame opposite the leg of the L and rearwardly beyond the base of the L.

References Cited in the file of this patent
UNITED STATES PATENTS

| | | |
|---|---|---|
| 1,238,570 | Rodecker | Aug. 28, 1917 |
| 1,686,658 | Healey | Oct. 9, 1928 |
| 1,927,877 | Meyer | Sept. 26, 1933 |
| 2,277,235 | Kidder | Mar. 24, 1942 |
| 2,481,462 | Woodland | Sept. 6, 1949 |
| 2,516,277 | Vichie | July 25, 1950 |
| 2,556,509 | Thomson | June 12, 1951 |
| 2,667,732 | Thomson | Feb. 2, 1954 |
| 2,669,823 | Kramer | Feb. 23, 1954 |
| 2,782,581 | Thomson | Feb. 26, 1957 |